United States Patent
Wiesbeck et al.

(10) Patent No.: US 11,192,538 B2
(45) Date of Patent: Dec. 7, 2021

(54) METHOD AND DEVICE FOR OPERATING A HYBRID VEHICLE HAVING AN ELECTRICAL ENERGY STORE, AN ELECTRIC MOTOR AND AN INTERNAL COMBUSTION ENGINE

(71) Applicant: Bayerische Motoren Werke Aktiengesellschaft, Munich (DE)

(72) Inventors: Ferdinand Wiesbeck, Munich (DE); Andy Sittig, Fuerstenfeldbruck (DE); Daniel Mau, Munich (DE); Andreas Geser, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 289 days.

(21) Appl. No.: 16/119,061

(22) Filed: Aug. 31, 2018

(65) Prior Publication Data
US 2018/0370521 A1    Dec. 27, 2018

Related U.S. Application Data

(63) Continuation of application No. PCT/EP2017/054321, filed on Feb. 24, 2017.

(30) Foreign Application Priority Data

Mar. 2, 2016 (DE) ...................... 10 2016 203 401.4

(51) Int. Cl.
*B60W 20/13* (2016.01)
*B60W 50/08* (2020.01)
(Continued)

(52) U.S. Cl.
CPC ............. *B60W 20/13* (2016.01); *B60L 50/10* (2019.02); *B60L 58/12* (2019.02); *B60W 20/15* (2016.01);
(Continued)

(58) Field of Classification Search
CPC ..... B60W 20/13; B60W 20/20; B60W 50/085
See application file for complete search history.

(56) References Cited

U.S. PATENT DOCUMENTS

2005/0080523 A1    4/2005 Bennett et al.
2009/0248228 A1*  10/2009 Miller .................. B60W 10/06
                                                     701/22
(Continued)

FOREIGN PATENT DOCUMENTS

| CN | 103223942 A | 7/2013 |
| CN | 103863309 A | 6/2014 |

(Continued)

OTHER PUBLICATIONS

PCT/EP2017/054321, International Search Report dated May 30, 2017 (Three (3) pages).

(Continued)

*Primary Examiner* — Donald J Wallace
(74) *Attorney, Agent, or Firm* — Crowell & Moring LLP

(57) ABSTRACT

A method for operating a hybrid vehicle having an electrical energy store, an electric drive and an internal combustion engine, includes activating, by a driver of the hybrid vehicle, a battery control mode by actuating a defined operator control element. A special drive operating strategy for the internal combustion engine is triggered in the battery control mode with the electric drive switched off. An increased charging gradient is then obtained by the special drive operating strategy if a current state of charge of the electrical energy store is below one of a desired state of charge or a lower tolerance threshold with respect to the desired state of charge.

9 Claims, 3 Drawing Sheets

(51) Int. Cl.
    *B60W 20/20*     (2016.01)
    *B60L 58/12*     (2019.01)
    *B60L 50/10*     (2019.01)
    *B60W 20/15*     (2016.01)
    *B60W 20/17*     (2016.01)
    *B60W 50/00*     (2006.01)
    *B60W 20/00*     (2016.01)

(52) U.S. Cl.
    CPC ............ *B60W 20/17* (2016.01); *B60W 20/20* (2013.01); *B60W 50/085* (2013.01); *B60W 20/00* (2013.01); *B60W 2050/0066* (2013.01); *B60W 2510/244* (2013.01); *B60W 2540/215* (2020.02); *B60W 2710/0644* (2013.01); *B60W 2710/0666* (2013.01); *B60W 2710/0677* (2013.01); *B60W 2710/08* (2013.01); *B60W 2710/081* (2013.01); *B60W 2710/083* (2013.01); *B60W 2710/086* (2013.01); *B60W 2710/244* (2013.01); *Y02T 10/70* (2013.01); *Y02T 10/7072* (2013.01)

(56) References Cited

U.S. PATENT DOCUMENTS

| | | |
|---|---|---|
| 2011/0166733 A1 | 7/2011 | Yu et al. |
| 2012/0239233 A1* | 9/2012 | Koprubasi ............ B60L 58/12 701/22 |
| 2014/0097673 A1* | 4/2014 | Papajewski ............ B60W 20/11 307/9.1 |
| 2014/0172206 A1* | 6/2014 | Roos .................... B60W 10/08 701/22 |
| 2015/0120104 A1 | 4/2015 | Stefanon et al. |
| 2015/0298570 A1 | 10/2015 | Hisano |
| 2015/0375733 A1* | 12/2015 | Limbacher ............ B60W 10/06 701/22 |

FOREIGN PATENT DOCUMENTS

| | | |
|---|---|---|
| CN | 104410120 A | 3/2015 |
| CN | 105000014 A | 10/2015 |
| CN | 105073540 A | 11/2015 |
| DE | 10 2011 104 443 A1 | 2/2012 |
| DE | 10 2011 102 766 A1 | 11/2012 |
| DE | 10 2013 113 831 A1 | 6/2014 |
| WO | WO 2014/167414 A1 | 10/2014 |

OTHER PUBLICATIONS

German Search Report issued in German counterpart application No. 10 2016 203 401.4 dated May 10, 2016, with Statement of Relevancy (Seven (7) pages).

Chinese Office Action issued in Chinese application No. 201780011677.7 dated Aug. 24, 2020, with English translation (Sixteen (16) pages).

\* cited by examiner

METHOD AND DEVICE FOR OPERATING A HYBRID VEHICLE HAVING AN ELECTRICAL ENERGY STORE, AN ELECTRIC MOTOR AND AN INTERNAL COMBUSTION ENGINE

CROSS REFERENCE TO RELATED APPLICATIONS

This application is a continuation of PCT International Application No. PCT/EP2017/054321, filed Feb. 24, 2017, which claims priority under 35 U.S.C. § 119 from German Patent Application No. 10 2016 203 401.4, filed Mar. 2, 2016, the entire disclosures of which are herein expressly incorporated by reference.

BACKGROUND AND SUMMARY OF THE INVENTION

The invention relates to a method and a device for operating a hybrid vehicle having an electrical energy store, with an electric motor as the first driving motor and an internal combustion engine as the second driving motor.

A variety of operating strategies for hybrid vehicles are already known, the specific focus of which is efficient driving.

The object of the present invention is to operate a hybrid vehicle as flexibly as possible, in accordance with the requirements of the driver.

According to the invention, this object is fulfilled by the characteristics of the independent claims, whereas preferred further developments of the invention are specified in the dependent claims.

In principle, the invention relates to a method and a device for operating a hybrid vehicle having an electrical energy store (e.g. a high-voltage battery), an electric drive and an internal combustion engine, in which a specific mode ("battery control") can be activated by actuating a defined operator control element. Further to the activation of the specific mode herein, a special drive operating strategy for the internal combustion engine is triggered with the electric drive switched off, by means of which an increased charging gradient is obtained, if the current state of charge is below a desired state of charge, or at least below a lower tolerance threshold with respect to a desired state of charge.

If the current state of charge lies above a desired state of charge, or at least above an upper tolerance threshold with respect to a desired state of charge, the drive operating strategy is preferably activated, which strategy is automatically deployed during regular operation outside the specific mode if the high-voltage store is sufficiently charged, and which permits electric propulsion (charge-depleting operation).

If the current state of charge corresponds to the desired state of charge, or at least lies below an upper tolerance threshold and above a lower tolerance threshold with respect to a desired state of charge, the drive operating strategy is preferably activated, which strategy is automatically deployed during regular operation outside the specific mode if the high-voltage store is discharged, and which permits partial electric propulsion (charge-sustaining operation). Alternatively, in the second case, a particular operating strategy can also be activated, which is specifically appropriate for the maintenance of the state of charge within a narrow tolerance band, and which restricts electric propulsion.

The specific (rapid charging) mode thus occurs, where the hybrid vehicle is brought into service and can no longer be charged by means of an external energy source. The specific rapid charging mode specifically differs from known emergency charging modes in that a capacity-increasing special drive operating strategy is provided for the internal combustion engine, rather than the inconvenient disconnection of consumer loads, and in that an option is provided for the driver to dictate their own desired state of charge. In conventional hybrid vehicles, a system-integrated pre-set for a fixed minimum charge threshold is provided instead.

Preferably, any desired state of charge of the energy store can be configured by the driver by means of a further operator control element. Moreover, for the purposes of an increase in capacity, in particular acoustics-oriented and/or efficiency-oriented limitations on an increase in the rotational speed and/or an increase in the torque of the internal combustion engine are reduced or entirely canceled by means of the corresponding programing of the special drive operating strategy.

The invention is based upon the following considerations:

In general, hybrid vehicles have a number of selectable operating modes. One mode can involve, for example, the maintenance of a current state of charge and/or an increase in the state of charge of the high-voltage battery during travel. In the vehicles of the applicant, for example, one mode can involve the maintenance of a minimum state of charge of, for example, 50% and/or an increase in the state of charge to 50%.

The majority of vehicle manufacturers respectively provide one full-charging mode and one mode for the maintenance of a fixedly predefined state of charge.

In existing modes, when charging is executed during travel by means of the internal combustion engine, no state of charge which exceeds a predefined and fixed threshold (e.g. 50%) can be achieved. At the same time, no state of charge lower than 50% can be maintained. Additionally, the plurality of modes available increases the design complexity of indicators and operator controls.

According to the invention, a novel (and preferably unique) specific mode is proposed, having the following characteristics:

A desired state of charge is configurable, independently of the current state of charge.

With the mode activated, the desired state of charge is pursued independently of the current state of charge and, upon the achievement thereof, is maintained.

If the current state of charge exceeds the desired state of charge, a preferred operating mode is possible, which can also result in the discharging of the high-voltage store, until the desired state of charge is achieved, or is close to being achieved. Preferably, the operating mode is selected which is employed in regular operation, other than in the specific mode, with the store fully charged. Herein, in automatic operation, with a sufficiently charged high-voltage store, electric propulsion is permitted (charge-depleting operation).

If the current state of charge lies between an upper and/or a lower tolerance threshold relative to the desired state of charge, the vehicle preferably maintains the state of charge within a band around the desired state of charge. Herein, for example, a comparatively narrow band can be selected, with a tight restriction on electric propulsion. However, an operating strategy for the most efficient possible electric propulsion can also be selected, which can even be employed with a (virtually) empty store. This can result in a comparatively broad band.

Where the current state of charge is lower than the desired state of charge, or undershoots a lower tolerance threshold below the desired state of charge, the state of charge is increased until the desired state of charge is achieved.

At any time, the driver can configure a desired state of charge, and can actuate the new mode by the actuation of a defined operator control element. Immediately after the activation of the new mode, according to the invention, a special drive operating strategy is deployed by means of which, in comparison with other modes, an increased charging gradient is achieved, provided that the current state of charge at least lies below the desired state of charge. The special drive operating strategy herein is preferably configured such that acoustics-oriented and/or efficiency-oriented limitations on an increase in the rotational speed and/or an increase in the torque of the internal combustion engine are reduced or entirely canceled. Accordingly, pending the achievement of the desired state of charge, or at least of a lower tolerance threshold relative to the desired state of charge, more strongly perceptible noises than in regular operation and/or (alternatively or additionally, in a second step for a further increase in capacity) non-efficient working points of the internal combustion engine are also accepted. The resulting short-term increase in emissions is offset by the storage of electrical energy for the operation of the emission-free electric motor.

Other objects, advantages and novel features of the present invention will become apparent from the following detailed description of one or more preferred embodiments when considered in conjunction with the accompanying drawings.

BRIEF DESCRIPTION OF THE DRAWINGS

An exemplary embodiment of the invention is illustrated in the drawing, and is described in greater detail hereinafter. In the drawing.

DETAILED DESCRIPTION OF THE DRAWINGS

Figure 1:
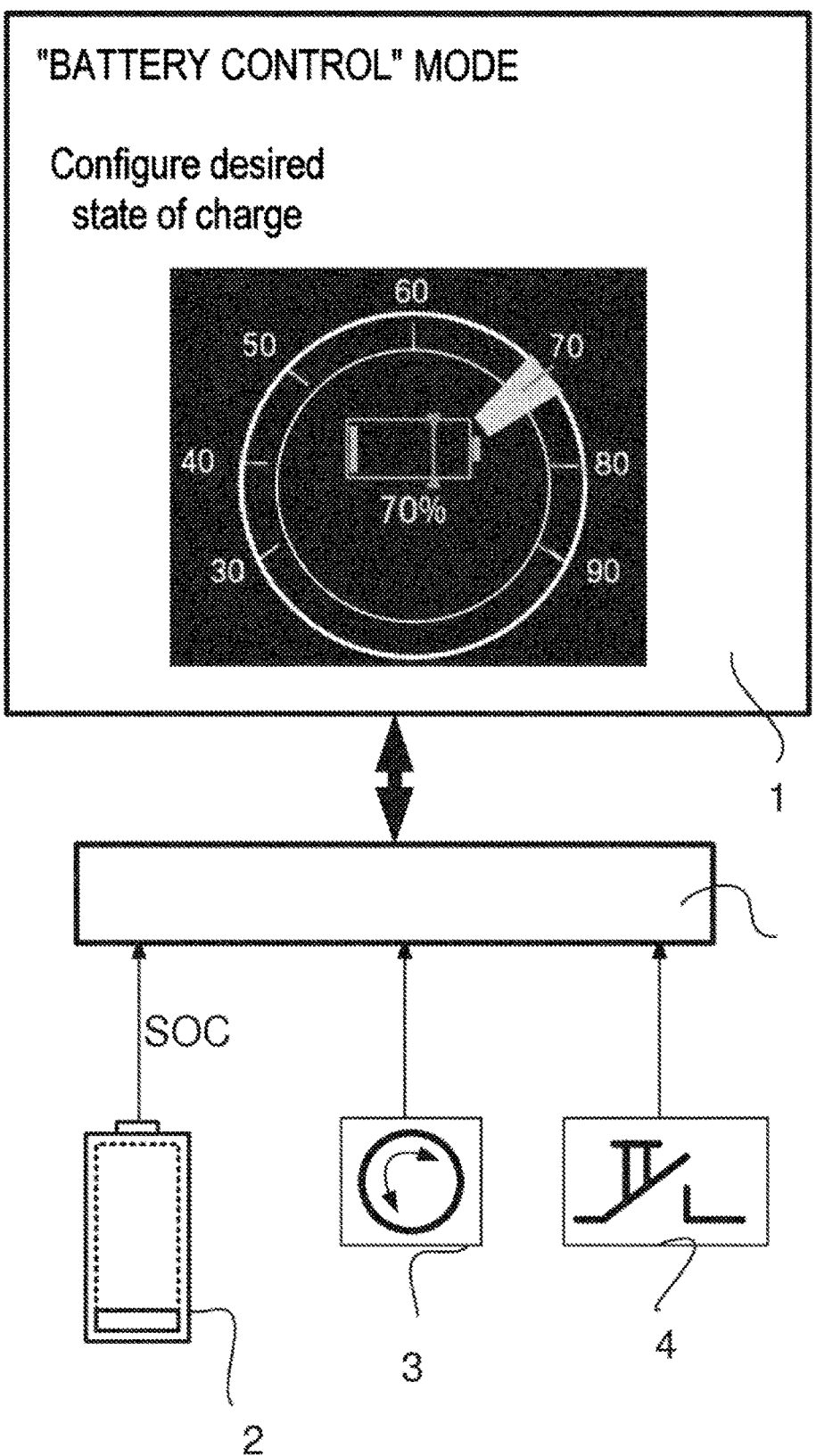
FIG. 1 shows a schematic overview of the key components of the invention.

FIG. 1 represents an input/output read-out 1 for the output of information on the specific "BATTERY CONTROL" mode according to the invention, and for the input of selection options for the driver. The read-out 1 is controlled by means of an electronic control unit 5. The current state of charge SOC of an electrical energy store 2, in this case a high-voltage battery, the setting of a first operator control element 3, in this case in the form of a rotary pushbutton switch, and the status of a second operator control element 4, in this case a pushbutton, are the input signals of the control unit 5.

By means of the first operator control element 3, any desired state of charge SOC_W between 0% (or, where applicable, between a predefined minimum state of charge of the order of a few percent, in the single-digit range) and 100% can be selected by the driver by rotation, and configured by pressing (in this case, e.g. 70%).

By the actuation of the second operator control element 4, the specific "Battery Control" mode can be activated.

Figure 2:
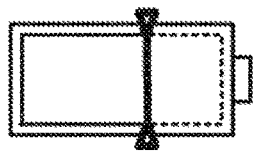
FIG. 2 shows a potential first item of read-out information for the operating strategy according to the invention, with the desired state of charge achieved.

According to FIG. 2, a potential first item of information on the read-out 1 for the operating strategy according to the invention, with the desired state of charge achieved, is "Maintain set state of charge". Moreover, the configuration of the desired state of charge according to FIG. 1 can be selected using the menu item "Configure desired state of charge".

Figure 3:
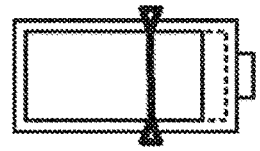
FIG. 3 shows a potential second item of read-out information for the operating strategy according to the invention, with the desired state of charge exceeded.

According to FIG. 3, a potential second item of information on the read-out 1 for the operating strategy according to the invention, in the event of an overshoot of the desired state of charge, is "Maintain set state of charge after achievement". Here again, moreover, the configuration of the desired state of charge according to FIG. 1 can be selected using the menu item "Configure desired state of charge".

Figure 4:
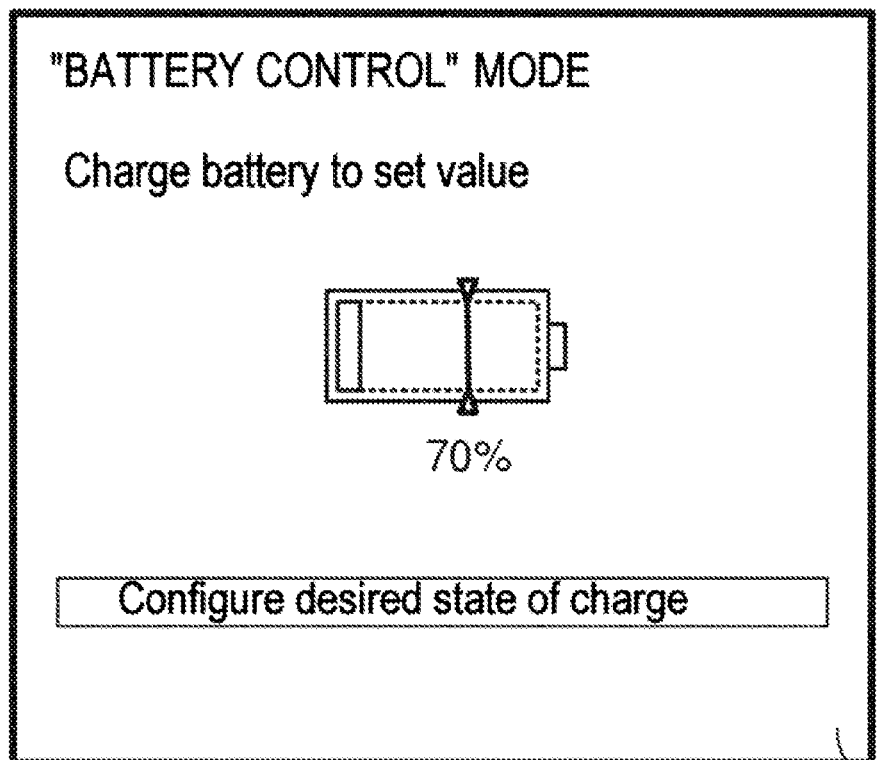
FIG. 4 shows a potential third item of read-out information for the operating strategy according to the invention, with an undershoot of the desired state of charge.

According to FIG. 4, a potential third item of information on the read-out 1 for the operating strategy according to the invention, in the event of an undershoot of the desired state of charge, is "Charge battery to set state of charge". Here again, moreover, the configuration of the desired state of charge according to FIG. 1 can be selected using the menu item "Configure desired state of charge".

Figure 5:
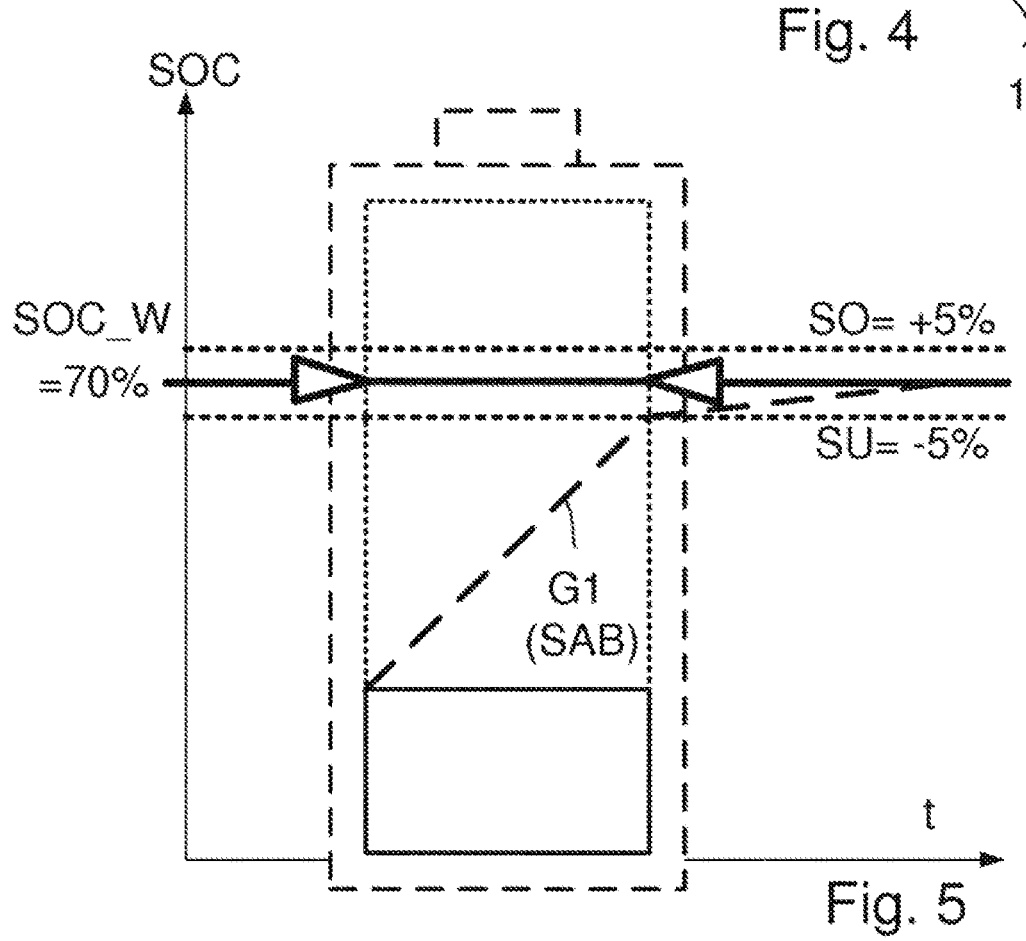
FIG. 5 shows a diagram of the operating strategy according to the invention.

In the diagram according to FIG. 5, the broken line indicates the special drive operating strategy SAB according to the invention for the internal combustion engine, with the electric drive switched off, with a predefined minimum charge gradient G1. Provided that the current state of charge SOC lies below a lower tolerance threshold SU here (e.g. 5% below the desired state of charge SOC_W), the special drive operating strategy SAB is executed such that acoustics-oriented and/or efficiency-oriented limitations on an increase in the rotational speed and/or an increase in the torque of the internal combustion engine are reduced or entirely canceled, even if (at least in a second step) the internal combustion engine is operating at a non-efficient working point as a result.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a hybrid vehicle having an electrical energy store, an electric drive and an internal combustion engine, the method comprising the acts of:
    activating, by a driver of the hybrid vehicle, a battery control mode by actuating a defined operator control element;
    triggering a special drive operating strategy for the internal combustion engine in the battery control mode with the electric drive switched off; and
    obtaining, by the special drive operating strategy, an increased charging gradient of the electrical energy store if a current state of charge of the electrical energy store is below one of a desired state of charge or a lower tolerance threshold with respect to the desired state of charge;
    wherein any desired state of charge of the energy store can be configured by the driver of the hybrid vehicle via a further operator control element.

2. The method as claimed in claim 1, wherein the special drive operating strategy is configured such that acoustics-oriented and/or efficiency-oriented limitations on an increase in the rotational speed and/or an increase in the torque of the internal combustion engine are reduced or entirely canceled.

3. The method as claimed in claim 1, wherein, if the current state of charge lies above the desired state of charge or above an upper tolerance threshold with respect to the desired state of charge, the method further comprises triggering the drive operating strategy during regular operation outside of the battery control mode if the electrical energy store is sufficiently charged to permit electric propulsion.

4. The method as claimed in claim 2, wherein, if the current state of charge lies above the desired state of charge or above an upper tolerance threshold with respect to the desired state of charge, the method further comprises triggering the drive operating strategy during regular operation outside of the battery control mode if the electrical energy store is sufficiently charged to permit electric propulsion.

5. The method as claimed in claim 1, wherein, if the current state of charge corresponds to the desired state of charge or lies below an upper tolerance threshold and above the lower tolerance threshold with respect to the desired state of charge, the method further comprises
   activating the special drive operating strategy during regular operation outside the battery control mode if the electrical energy store is discharged and permits partial electric propulsion, or
   activating a particular operating strategy, which is specifically appropriate for a maintenance of the current state of charge within a comparatively narrow tolerance band, and which at least restricts electric propulsion.

6. The method as claimed in claim 2, wherein, if the current state of charge corresponds to the desired state of charge or lies below an upper tolerance threshold and above the lower tolerance threshold with respect to the desired state of charge, the method further comprises
   activating the special drive operating strategy during regular operation outside the battery control mode if the electrical energy store is discharged and permits partial electric propulsion, or
   activating a particular operating strategy, which is specifically appropriate for a maintenance of the current state of charge within a comparatively narrow tolerance band, and which at least restricts electric propulsion.

7. The method as claimed in claim 3, wherein, if the current state of charge corresponds to the desired state of charge or lies below the upper tolerance threshold and above the lower tolerance threshold with respect to the desired state of charge, the method further comprises
   activating the special drive operating strategy during regular operation outside the battery control mode if the electrical energy store is discharged and permits partial electric propulsion, or
   activating a particular operating strategy, which is specifically appropriate for a maintenance of the current state of charge within a comparatively narrow tolerance band, and which at least restricts electric propulsion.

8. A device configured to operate a hybrid vehicle having an electrical energy store, an electric drive and an internal combustion engine, the device comprising:
   an operator control element configured to be actuated by a driver of the hybrid vehicle;
   an electronic control unit, connected to the operator control element, configured to:
   activate a battery control mode in response to an actuation of the operator control element by the driver, and
   trigger a special drive operating strategy for the internal combustion engine in the battery control mode with the electric drive switched off,
   wherein an increased charging gradient of the electrical energy store is obtained by the special drive operating strategy if a current state of charge of the electrical energy store is below one of a desired state of charge or a lower tolerance threshold with respect to the desired state of charge; and
   a further operator control element, coupled to the electronic control unit, wherein any desired state of charge of the energy store can be configured by the driver of the hybrid vehicle via the further operator control element.

9. A hybrid vehicle comprising:
   an electrical energy store;
   an electric drive;
   an internal combustion engine;
   an operator control element configured to be actuated by a driver of the hybrid vehicle;
   an electronic control unit, connected to the operator control element, configured to:
   activate a battery control mode in response to an actuation of the operator control element by the driver, and
   trigger a special drive operating strategy for the internal combustion engine in the battery control mode with the electric drive switched off,
   wherein an increased charging gradient of the electrical energy store is obtained by the special drive operating strategy if a current state of charge of the electrical energy store is below one of a desired state of charge or a lower tolerance threshold with respect to the desired state of charge; and
   a further operator control element, coupled to the electronic control unit, wherein any desired state of charge of the energy store can be configured by the driver of the hybrid vehicle via the further operator control element.

* * * * *